Aug. 14, 1928.
O. M. URBAIN
1,680,349
PROCESS AND APPARATUS FOR DIALYZING LIQUIDS
Filed July 15, 1927
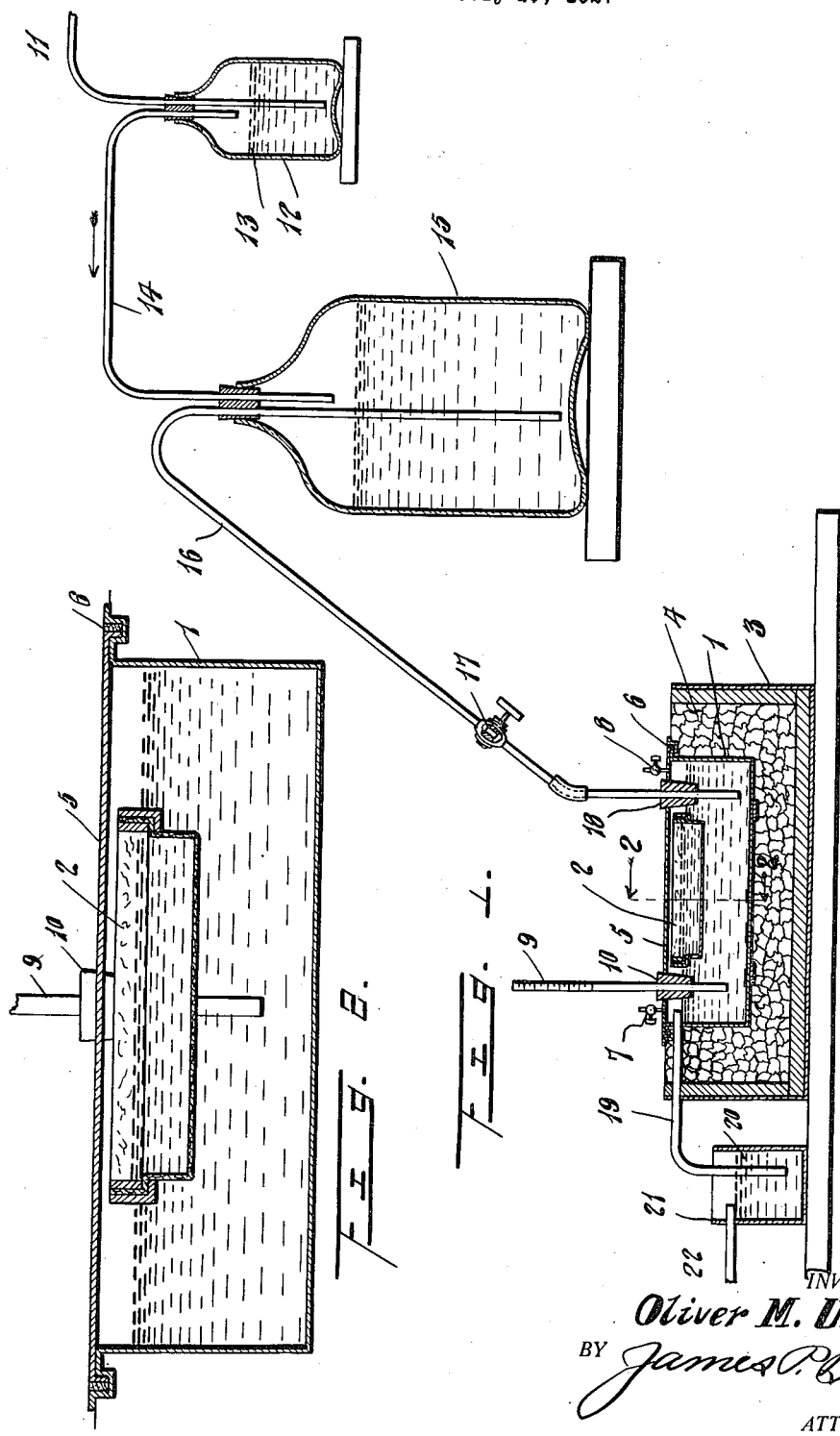
INVENTOR.
Oliver M. Urbain.
BY James P. Burns
ATTORNEY.

Patented Aug. 14, 1928.

1,680,349

UNITED STATES PATENT OFFICE.

OLIVER M. URBAIN, OF COLUMBUS, OHIO, ASSIGNOR, BY MESNE ASSIGNMENTS, TO THE TRAVERS PROCESS CORPORATION, OF COLUMBUS, OHIO, A CORPORATION OF OHIO.

PROCESS AND APPARATUS FOR DIALYZING LIQUIDS.

Application filed July 15, 1927. Serial No. 205,958.

This invention relates to an improved process and apparatus for dialyzing liquids for the purpose of separating colloids from crystalloids contained in the liquid.

I am aware that dialyzers have been used for separating soluble crystalloid substances from colloidal substances in a mixture based on the principle that crystalloids will diffuse readily through a moist membrane such as a sheet of parchment paper floating in water, while the colloids will not diffuse through the membrane.

The known dialyzers do not, however, give accurate results, particularly when the mixture dialyzed possesses characteristics which cause its composition to change during the period required for the dialyzing of the liquid, such for example, as putrescible liquids of the character of domestic sewage and various industrial wastes, which putrify rapidly in the presence of oxygen, even at room temperature. A successful dialyzing operation requires considerable time, frequently several days. A putrescible liquid varies so readily under the conditions employed in the known dialyzing operations that at the end of the operation, it is in no sense comparable to the original material.

The present invention contemplates the provision of an improved dialyzer and one more especially adapted for separating the colloids contained in a putrescible liquid from the crystalloids in solution in such liquids whereby the true colloidal content of such a putrescible liquid may be definitely and accurately ascertained.

More specifically the present invention contemplates the provision of a dialyzer of such character that the dialyzing operation may be effected at a low temperature in the absence of oxygen and the dialyzing membrane kept moist by water, the dissolved oxygen of which has been removed, whereby putrefaction of and bacterial growth in, the liquid being dialyzed is prevented.

The accompanying drawings illustrate the present preferred embodiment of my invention. It will be understood, however, that the broad principles of my invention may be effectively employed in other embodiments than that illustrated.

Figure 1 illustrates a vertical sectional view of the apparatus for dialyzing liquids disclosing the various members in assembled and operative relationship.

Figure 2 represents a sectional view of Figure 1, taken along the line 2—2.

In the drawings, the reference character 1 designates the outer or water containing vessel of my dialyzer. Suitably floated in the water in the vessel 1 is a tray 2 for containing the liquid to be dialyzed. The tray 2 should be of sufficient area that the liquid therein need not be maintained at an excessive depth. I prefer to have the liquid in the tray at a depth of from substantially $\frac{1}{4}$ to $\frac{1}{2}$ inch, though this is merely illustrative. The tray 2 is so weighted that the surface of the liquid in the tray is slightly higher than the surface of the water in the vessel 1. This permits the operator to make the necessary correction in the volume of the liquid dialyzed after completion of the dialyzing operation by adding distilled water to equal the original volume. It will be understood that the tray 2 may be made from a parchment membrane or other suitable dialyzing membrane.

The vessel 1 is suitably supported within an outer container or box member 3. The arrangement is such that the box 3 is considerably larger than the vessel 1. The space 4 between the walls of the box and the vessel 1 is preferably filled with ice, as indicated in the drawing. This ice pack enables the operator to keep the contents of the dialyzer tray 2 at a temperature sufficiently low to prevent putrefaction under the existing conditions. I prefer to maintain the temperature at from 1 to 2° C. This will, however, vary, depending upon the character of the liquid being dialyzed.

The vessel 1 is provided with a removable top member 5 which is adapted to be hermetically sealed to exclude air from the vessel by a suitable sealing medium such as sealing wax, as indicated at 6. The top member 5 has two valve controlled openings 7 and 8, the function of which is to permit the air in the vessel 1 to be exhausted therefrom at the commencement of the dialyzing operation and to be replaced by a suitable gas devoid of oxygen such, for example, as nitrogen. The air may be exhausted through the opening 7 by a suitable pump (not shown), and nitrogen admitted to replace the air through the opening 8. When the air has been entirely replaced by a suitable gas, such as an atmosphere of nitrogen, the openings 7 and 8 are closed and hermetically sealed.

A thermometer 9 extends through a hermetically sealed bushing 10 into the vessel 1 so that the temperature of the dialyzing water may at all times be observed, enabling an accurate control of the temperature conditions.

A supply of distilled water which has been heated to a boiling temperature to remove the dissolved oxygen content and cooled while out of contact with air is maintained in the reservoir 15. A suitable vessel 12 is provided which contains a quantity of potassium pyrogallate 13. An air inlet 11 communicates with the vessel 12. As the water level in reservoir 15 recedes, due to the supply of water passing through the dialyzer, the nitrogen necessary to replace the liquid withdrawn from reservoir 15 is drawn in through inlet 11 as air which bubbles through the potassium pyrogallate 13, the oxygen of the air being entirely absorbed thereby and permitting only pure nitrogen to enter the reservoir 15. Thus, the vessel 12 with its content of potassium pyrogallate serves as an oxygen trap, enabling the operation to effectively prevent any oxygen from entering the dialyzing water supply in 15. The rate of flow of the dialyzing water through the dialyzer is approximately one pint per hour. The water leaving vessel 15 through line 16 enters the vessel 1 through a hermetically sealed bushing 18 similar to the bushing 10. The arrangement shown is such that the dialyzing water is supplied by gravity flow to the vessel 1.

From the vessel 1 the dialyzing water with its crystalloid content passes through the outlet line 19, the discharge end of which is submerged in a body of liquid 20 in the vessel 21, the arrangement being such that a liquid seal is formed, preventing any back flow of air to the vessel 1. The spent liquid overflows from the vessel 21 through the outlet line 22.

The operation of my improved process and apparatus for dialyzing liquid will be apparent from the foregoing description. Accordingly no detailed outline of the operation is deemed necessary. It will be noted that the dialyzing operation is effected in an atmosphere devoid of oxygen and by employing water, the dissolved oxygen content of which has been removed so that a highly putrescible substance may be effectively dialyzed without change in composition during the dialyzing period.

I desire it understood that the disclosure herein contained is to be regarded in an illustrative and not a limiting sense.

I claim:—

1. A method for dialyzing a putrescible liquid comprising maintaining the liquid in a dialyzing tray floated in water in a zone free from oxygen.

2. A method for dialyzing a putrescible liquid comprising maintaining the liquid in a dialyzing tray floated in water in a zone free from oxygen and in the presence of an atmosphere of nitrogen.

3. A method for dialyzing a putrescible liquid comprising maintaining the liquid in a dialyzing tray floated in water in a zone free from oxygen while at a temperature below 5° C.

4. A method for dialyzing a putrescible liquid comprising maintaining the liquid in a dialyzing tray floated in water in a zone free from oxygen and in the presence of an atmosphere of nitrogen while at a temperature below 5° C.

5. A method for dialyzing liquids to separate colloids from crystalloids comprising maintaining the liquid to be dialyzed in a parchment tray in a zone devoid of oxygen and keeping the parchment tray moist by flowing water free from dissolved oxygen in contact therewith.

OLIVER M. URBAIN.